US006842615B2

(12) United States Patent
Angin

(10) Patent No.: US 6,842,615 B2
(45) Date of Patent: Jan. 11, 2005

(54) LEAST COST ROUTING FOR MOBILE SATELLITE SYSTEMS EMPLOYING A GPRS NETWORK INFRASTRUCTURE

(75) Inventor: Oguz Angin, Clarksburg, MD (US)

(73) Assignee: Comsat Corporation, Clarksburg, MD (US)

( * ) Notice: Subject to any disclaimer, the term of this patent is extended or adjusted under 35 U.S.C. 154(b) by 287 days.

(21) Appl. No.: 09/904,909

(22) Filed: Jul. 16, 2001

(65) Prior Publication Data

US 2002/0032029 A1 Mar. 14, 2002

Related U.S. Application Data

(60) Provisional application No. 60/218,213, filed on Jul. 14, 2000.

(51) Int. Cl.$^7$ ................................. H04Q 7/20
(52) U.S. Cl. ................... 455/432.1; 370/238; 370/230; 455/445
(58) Field of Search ................... 455/455, 427, 455/436, 439, 442, 432.1, 450, 451, 452.1, 453, 12.1, 13.1, 13.2, 445, 428, 446, 440, 433, 560, 443, 444, 452.2; 370/238, 230, 232, 235, 329, 331, 401; 709/238, 241

(56) References Cited

U.S. PATENT DOCUMENTS

| | | | | |
|---|---|---|---|---|
| 6,137,783 A | * | 10/2000 | Sallberg | ..................... 370/316 |
| 6,385,451 B1 | * | 5/2002 | Kalliokulju et al. | ........ 455/437 |
| 6,415,151 B1 | * | 7/2002 | Kreppel | ..................... 455/445 |
| 2002/0061746 A1 | * | 5/2002 | Jo et al. | ..................... 455/433 |

FOREIGN PATENT DOCUMENTS

GB 2328117 A * 2/1999

* cited by examiner

Primary Examiner—Nick Corsaro
Assistant Examiner—Angelica Perez
(74) Attorney, Agent, or Firm—Sughrue, Mion, PLLC

(57) ABSTRACT

A telecommunications network including sub-telecommunications networks for transferring information including packet data which comprises one or more mobile stations, a first sub-telecommunications network, and a second sub-telecommunications network interconnected with the first sub-telecommunications network. The network further includes a number of gateway GPRS support nodes, and one or more gateway GPRS support nodes corresponding to each of the first sub-telecommunications network and the second sub-telecommunications network. Each of the gateway GPRS support nodes is operable to provide interworking between the first and the second sub-telecommunications networks and external packet data networks. The network also includes a system controlled in accordance with a procedure for transferring packet data within a multi-country telecommunications network. The procedure includes detecting data packets corresponding to a particular mobile station routed through the first sub-telecommunications network, and detecting data packets corresponding to the particular mobile station transferred between the first sub-telecommunications network and the second sub-telecommunications network. The system and process further include determining whether to transfer routing control from the first sub-telecommunications network to the second sub-telecommunications network based on the reported routed data packets and the reported transferred data packets, when the reported transferred data packets exceed a predetermined threshold of the reported routed data packets.

17 Claims, 4 Drawing Sheets

LEAST COST ROUTING FOR MOBILE SATELLITE SYSTEMS EMPLOYING A GPRS NETWORK INFRASTRUCTURE

This application claims the benefit of U.S. Provisional Application No. 60/218,213 filed Jul. 14, 2000, under 35 U.S.C. § 119(e)

TECHNICAL FIELD

This invention relates generally to mobile telecommunication systems, and more particularly, to mobile satellite systems supporting existing terrestrial cellular communications technologies.

BACKGROUND

This invention relates generally to mobile telecommunication systems, and more particularly, to extending the existing GPRS architectural model to include multi-beam geostationary satellite systems. Disclosed are a method and apparatus providing an efficient solution to the problem of least cost routing for packet data traffic to/from IP networks in a mobile satellite system employing General Packet Radio Service (GPRS) network infrastructure.

General Packet Radio Service (GPRS) is a random access packet data extension (data service) of the Global System for Mobile communications (GSM). GPRS uses a packet-mode technique to transfer high and low speed data and signaling in an efficient manner. The GPRS network infrastructure is built into the existing GSM system architecture with additional network elements, interfaces and identities. GPRS is composed of both radio access and network subsystems.

The GSM and GPRS standards are defined in technical specifications published by the European Telecommunications Standards institute (ETSI). These include ETSI GSM 03.03, ETSI GSM 03.60 and ETSI GSM 09.60, which are herein incorporated by reference.

A detailed description of the GPRS logical network architecture, Mobility & Location Management and Packet Routing Procedures can be found in the ETSI GSM Specification 03.60.

Basically, GPRS radio channels allocated flexibly in a TDMA frame, and the timeslots are shared by the active users. Uplink and downlink channels are allocated separately, and the radio interface resources may be shared dynamically between speech and data services based on, for example, load and operator preference. A variety of channel coding schemes are defined in the specification to provide a diversity of bit rates from 9 to more than 150 kbit/s per user. Generally, applications based on standard data protocols are supported, and interworking is defined with both IP networks and X.25. Network interworking is required whenever a network supporting GPRS and any other network are involved in the execution of a GPRS service request.

The GPRS standard supports several quality of service profiles as well as a variety of mobile station (MS) operational modes. For example an MS operating in A mode of operation performs GPRS and other GSM services simultaneously, an MS in B mode of operation simultaneously monitors GPRS and other GSM service control channels, but only performs one set of services at one time, and a MS in C mode of operation only performs GPRS services.

Generally, to initially access GPRS services, an MS must attach to a GPRS network and establish a logical link between the MS and the Serving GPRS Support Node (SGSN) of the GPRS network. The SGSN is described in more detail in the detailed description of the invention. The MS must also activate the packet data address to send and receive GPRS data over the GPRS network, this operation announces the MS to a corresponding Gateway GPRS Support Node (GGSN) so that interworking with external data networks can commence. The GGSN is also described in more detail in the detailed description of the invention.

User data is transferred between the MS and the external data networks by a method known as encapsulation and tunnelling, whereby data packets are equipped with GPRS-specific protocol information and transferred between the MS and GGSN. This transfer method has the advantage that it lessens the requirement for the GPRS network to interpret external data protocols.

The general problem in implementing the GPRS network infrastructure with the existing GSM system architecture to include multi-beam geostationary satellite systems is that no system exists for the efficient transfer of packet data between networks in separate countries.

In general, efficiency of such a data network increases as the amount of data interpretation and the steps involved in data transfer decrease. A general measure of this efficiency is cost. Cost can be used as an indication of the efficiency of the paths that data packets are routed. As cost decreases, efficiency generally increases. The present invention describes a network and system whereby cost may be substantially reduced as compared with known terrestrial networks. In order to minimize the cost of transferring data packets to/from an MS employing a Satellite GPRS network, some times data packets must be transferred between networks in separate countries. A problem occurs in that the current GPRS systems do not specifically allow for the determination of a "least cost routing" between such networks in different countries. The cost minimization problem exists for both downlink (mobile terminated) and uplink (mobile originated) packet data transferred from and to the external packet data networks (PDNs), X.25 and IP networks. The present disclosure particularly addresses this problem for packet transfer to/from IP networks.

In the case of internetworking with IP networks, the entire satellite GPRS network will be defined as one Autonomous System (AS). The Internet is composed of multiple ASs. It is assumed that Border Gateway Protocol (BGP) [IETF RFC 1771] is used as an Exterior Gateway Protocol (EGP) between ASs whereas Open Shortest Path First (OSPF) [IETF RFC 2328] is used as an Interior Gateway Protocol (IGP) inside each AS. Usage of other EGPs or IGPs may be applicable, and the present invention is not limited to these specific examples.

To support the delivery of packets to hosts within the GPRS AS, the GGSNs must broadcast to the other ASs the addresses of hosts reachable through them. As the GPRS system is assumed to be one AS, the GGSNs will advertise the same path attribute in their BGP route update messages for reaching the MSs attached to the Satellite GPRS system. Therefore, any GGSN, given that it has an agreement with a particular ISP, can act as a gateway to the Internet for an MS independent of the MS's physical location. This may lead to the situation where packets destined for an MS may not use the country's GPRS network that the MS is attached to as the entry gateway for packets coming from the Internet. This will create across country traffic in the GPRS system.

The problem may also occur for uplink data transfer. Following the standard GPRS procedures, an MS registered with an SGSN will have to create a PDP context before packets can actually be transferred in the uplink direction. The context may be activated with any GGSN. If the chosen GGSN is in another country, this will again create across country packet data transfer. If the GGSN is in the same country with the SGSN, packets from the MS will have to be routed through that country's GPRS network regardless of the other end of the communication path. With the routing dynamics in the Internet and inside the GPRS AS, routing inside the GPRS AS may change and packet transfer between different countries' GPRS networks may be required, leading again to across country data traffic.

Therefore, independent of the direction of the packet flow during the actual transfer, if across country packet data transfer occurs "too often," as explained in the detailed description of the invention, this will create an inefficient packet data routing and produce the least cost routing problem.

The present invention dynamically achieves least cost routing for a mobile station in a satellite GPRS system, thereby minimizing the least cost routing problem, based on the real-time behavior of IP data packets while necessitating minimal new requirements to the existing terrestrial GPRS network infrastructure.

SUMMARY OF THE INVENTION

A system and process for transferring packet data within a multi-country telecommunications network are disclosed. The system and process include devices and methods for detecting data packets corresponding to a particular mobile station routed through a telecommunications network of a first country, and detecting data packets corresponding to the particular mobile station transferred between the telecommunications network of the first country and at least a telecommunications network of a second country. The system and process further include devices and methods for reporting the data packets routed through the telecommunications network of a first country, reporting the data packets transferred between the telecommunications network of a first country and the telecommunications network of the second country; and determining whether to transfer routing control from the telecommunications network of the first country to the telecommunications network of the second country based on the reported routed data packets and the reported transferred data packets, when the reported transferred data packets exceed a predetermined threshold of the reported routed data packets.

BRIEF DESCRIPTION OF THE DRAWINGS

For a better understanding of the present invention, reference may be made to the accompanying drawings in which.

DETAILED DESCRIPTION

Generally, the present invention is an improvement upon the existing GSM and GPRS networks as defined by the ETSI GSM standards described in the Background. In particular, one aspect of the present invention is an improvement upon the "Inter SGSN Routing Area Update" procedure defined in Section 6.9.1.2.2 of ETSI GSM 03.60. The present invention contemplates extending the existing terrestrial GPRS system infrastructure to include satellite mobile systems. This strategy allows for the use of existing mobility and session management capabilities of terrestrial GPRS networks, with minimal additional requirements. This extended logical architecture will support dual-mode operational mobile stations that will make seamless interworking between terrestrial and satellite GPRS networks possible.

In order to fully understand the present invention, an overview of GSM and GPRS networks is in order. A GPRS network is logically implemented on a GSM network subsystem infrastructure through the addition of two network nodes, the Serving GPRS Support Node (SGSN) and the Gateway GPRS Support Node (GGSN). The SGSN has the same hierarchical level as the Mobile Switching Center (MSC) in a GSM network. The SGSN detects new GPRS mobile station (MS) data within the Routing Area (RA) under its control, keeps track of the individual MS locations, sends/receives data packets to/from the individual MSs and performs security, access control and charging functions. GGSN provides interworking with external Packet Data Networks (PDNs) and is connected with SGSNs via an Internet Protocol (IP) based GPRS backbone network. The GGSN is also responsible for establishing a Packet Data Protocol (PDP) context with the MS creating a logical connection between the MS and the GGSN for packet data transfer. The particular PDP context contains the routing information for a particular GPRS MS attached to the GGSN. The routing information is used to tunnel packets to the particular MS's current point of attachment, a particular SGSN, using the specified Gateway Tunneling Protocol (GTP). This protocol tunnels user data and signaling between GPRS Support Nodes in the GPRS backbone network and is described in detail in ETSI GSM 09.60. The GGSNs also take an active role in billing (charging) data traffic. Additionally, the Home Location Register (HLR) database information as described in the GSM specification is extended to support GPRS. Also, new interfaces and identities are introduced to the existing GSM infrastructure, as are described in detail below.

Figure 1:
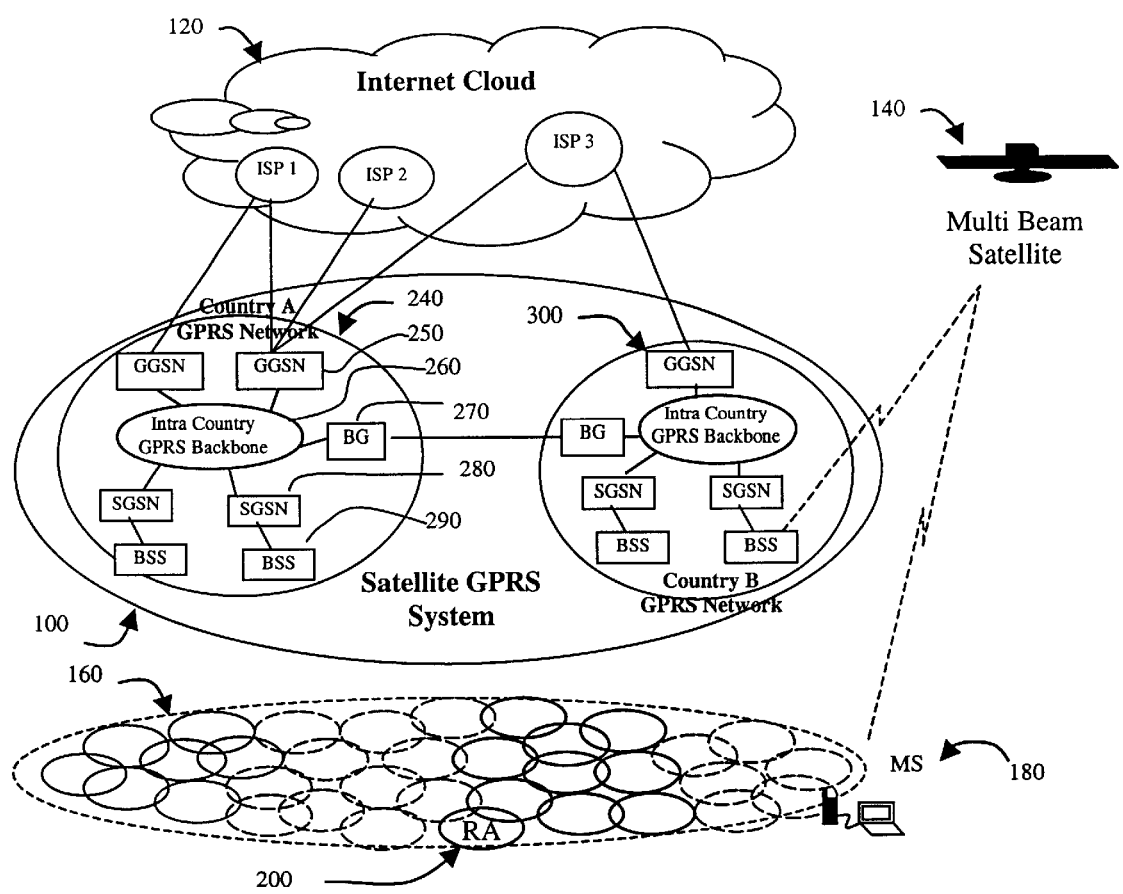
FIG. 1 is a schematic view of a geostationary satellite telecommunication network including a GPRS terrestrial network infrastructure according to one aspect of the present invention.

With reference to FIG. 1, a general satellite system model for a multi-beam geostationary (GEO) satellite telecommunication network including a GPRS terrestrial network infrastructure according to one aspect of the present invention is illustrated. In this aspect of the present invention, the External PDN uses IP. The illustrated system architecture model uses standard terrestrial GPRS satellite repeater.

The satellite GPRS system 100 according to one aspect of the present invention is partitioned into multiple GPRS networks on a country by country basis. The system 100 includes interconnection with: the Internet 120, including multiple service providers therein; a multi-beam satellite 140, which provides a terrestrial mobile coverage area 160 divided into routing areas 200; and a mobile station (MS) 180. Depending on the size of each country, one or multiple GGSNs 250 and SGSNs 280 are employed. For example, the system 100 according to one aspect of the present invention illustrated in FIG. 1, includes two sub-telecommunications networks, a GPRS network for a first country "A" (240) and a GPRS network for a second country "B" (300). In each country, GGSNs 250 and SGSNs 280 are connected through the intra-country GPRS backbone 260. Each SGSN also is connected with an associated base station system (BSS) 290.

Border Gateways (BGs) 270 are used to communicate between different GPRS networks of different countries. Each country does not necessarily have direct connection to all other countries, but it may make use of BGs and other countries' GPRS networks to reach an indirectly connected GPRS network. The address assignment to the GPRS network elements, GGSNs, SGSNs and BGs is also managed country by country, each country forming a subset of the satellite GPRS system address space.

As in terrestrial GPRS infrastructure, GGSNs will function as gateways to other PDNs. Each GGSN will have connectivity to one or more service providers of the external network. For example, in FIG. 1 each GGSN 250 provides gateway functionality through connectivity to one or multiple Internet Service Providers (ISPs) in the Internet 120, based on service agreements between the GPRS networks and the ISPs.

The satellite system coverage 160 is divided into Routing Areas (RAs) 200 and each SGSN 280 controls one or multiple Ras 200. For multibeam GEO satellite(s) 140, each spot beam generally corresponds to an RA 200. In the satellite GPRS system 100, each SGSN 280 can communicate directly to an MS 180 in any RA 200 in the systems coverage 160 using the satellite 140 link.

The satellite GPRS system according to one aspect of the present invention includes extensions to identities and network elements of the conventional GPRS network system, as well as new notations, definitions and rules. These modifications of the conventional GPRS network system are necessary to solve the least cost routing problem, and provide efficient transfer of packet data between different countries.

The GPRS satellite system model illustrated in FIG. 1, assumes that each SGSN 280 serves the entire system coverage area 160 and can communicate directly to any MS 180 in the coverage area via the satellite link. Based on the broadcast channel information in each spot beam, an MS 180 is able to identify its current RA 200 location.

As each RA 200 can be reached by any SGSN 280, the Routing Area Identity (RAI) definition of a conventional GSM/GPRS network system has to be extended for unique identification in the satellite GPRS network infrastructure. In the conventional GSM/GPRS network, the RAI is defined by an operator, and identifies one or several operation cells within a routing area 200. The RAI is broadcast as system information over the network and is used by the MS to determine, when changing between cells, if a RA border was crossed. The RAI is described in detail in ETSI GSM 03.60, section 14. The format of the RAI is defined in ETSI GSM 09.60, section 7.9.3.

According to one aspect of the present invention, the new RAI definition, called RAIsatellite will consist of the RAI used in terrestrial GPRS networks extended with a uniquely defined SGSN identification number as follows: RAIsatellite=RAI+SGSN Number.

According to another aspect of the present invention, a unique configurable table called a "connectivity table" is introduced to define connectivity of each SGSN. Each SGSN is physically connected between other SGSNs and GGSNs in the country where that SGSN resides. The connectivity table describes the physical connections between such SGSNs and GGSNs. This table uses each GGSN as a reference key and lists all the SGSNs in that country with which the GGSN is connected. The order of the SGSNs in the connectivity table will be based on the GPRS network cost of reaching the reference GGSN, with the most preferred SGSN being at the top of the list. The entries in the table will be updated with additions or failures of network elements and dynamic cost changes in the GPRS network.

Throughout this disclosure, the GPRS network of the country where the particular MS of concern is currently attached will be referred to as the local GPRS network. The PDP contexts that are established with the GGSNs which reside in the local GPRS network will be defined as the local PDP contexts. The connectivity table at the SGSNs will be used in the derivation of the local PDP contexts from the set of the active PDP contexts. PDP contexts are described in detail in ETSI GSM 09.60, section 7.9.21.

The satellite GPRS system has a pool of PDP addresses for subscribed MSs that will be divided between countries. Each country will be given a subset of these addresses that will be managed locally in that country. Each GGSN will be configured with the address space information managed in its' respective country. These addresses may be statically or dynamically allocated to the subscribed MSs as defined in Section 9.2.1 of ETSI GSM 03.60. Each GPRS subscriber is identified by a unique International Mobile Subscriber Identity (IMSI) allocated to each mobile subscriber in the GSM system, and each GPRS subscriber is assigned one or more network layer addresses, i.e., PDP addresses, temporarily and/or permanently associated with the subscriber which conform to the standard addressing scheme of the respective network layer service used, e.g., an IP version 4 address, an IP version 6 address; or an X.121 address. PDP addresses are described in detail within ETSI GSM 03.60, section 14.

The satellite GPRS network system according to one aspect of the present invention also requires new rules for a new PDP context activation procedure necessary for packet data transfer. An example of these new rules will be explained with reference to a network initiated PDP context activation by the GGSN. When static address assignment is used for the MSs, each country's GGSNs will set up a PDP context for the subset of addresses managed by that country. On the other hand, for PDP address which are not managed by that network, the GGSN will forward the packet to the country where the PDP address is managed by that country. In the case of dynamic address assignment by the GPRS network, the same rules will apply. For dynamic address assignment by an ISP, it may be assumed that the GGSNs will be configured with the pool of ISP addresses. Therefore, it will be possible to set up the PDP context across countries between a GGSN and an MS that may be currently attached to an SGSN which is independent of the MS's physical location.

With regard to an MS initiated PDP context activation, the local GPRS network GGSNs will be used in the activation of the PDP context regardless of the type of address assignment of the MS, as in terrestrial GPRS network infrastructure.

While these rules provide for greater flexibility in the network system according to an aspect of the present invention, these rules for PDP context activation also make it possible for packets to travel across GPRS networks of different countries, creating a least cost routing problem. Accordingly, a unique packet-monitoring functionality is introduced at each of the BGs to detect actual packet transfer across a corresponding network and between different countries. The BGs in each country will report the packet monitoring statistics of these packet monitoring elements to the SGSNs of the same country. Then, the SGSNs will make a decision concerning optimal packet routing as explained in detail as follows.

According to this aspect of the present invention, the SGSNs will collect the packet monitoring statistics from the packet monitoring elements located at the BGs of the same country. These statistics will be used in determining the most efficient path and the best country for connection with the particular MS in question.

The packets seen at the packet monitoring elements may be forwarded from one GGSN to another GGSN across countries or sent to/from a GGSN from/to an SGSN in a different country establishing an across country PDP context using GTP. For both cases, the SGSN has the capability to process the header information of the monitored packets. The format of, and information contained in GPRS packet headers is described in ETSI GSM 03.60, section 9.6. In particular, an "outer header" will give information about the BGs used in both countries, whereas an "inner header" includes the final source/destination IP address information used to identify the PDP address of the particular MS.

For downlink traffic, incoming packets to the BGs are detected. The source IP address of the outer IP header of the packet points to the BG IP address in the country from which the packet has arrived. The destination IP address of the inner IP header points to the PDP address used by a specific MS.

For uplink traffic, outgoing packets from the BGs are detected. In this case, the destination IP address of the outer IP header of the packet indicates the BG IP address in the country to which the packet is travelling, whereas the source IP address of the inner IP header maps to the PDP address used by the particular MS.

Figure 2:
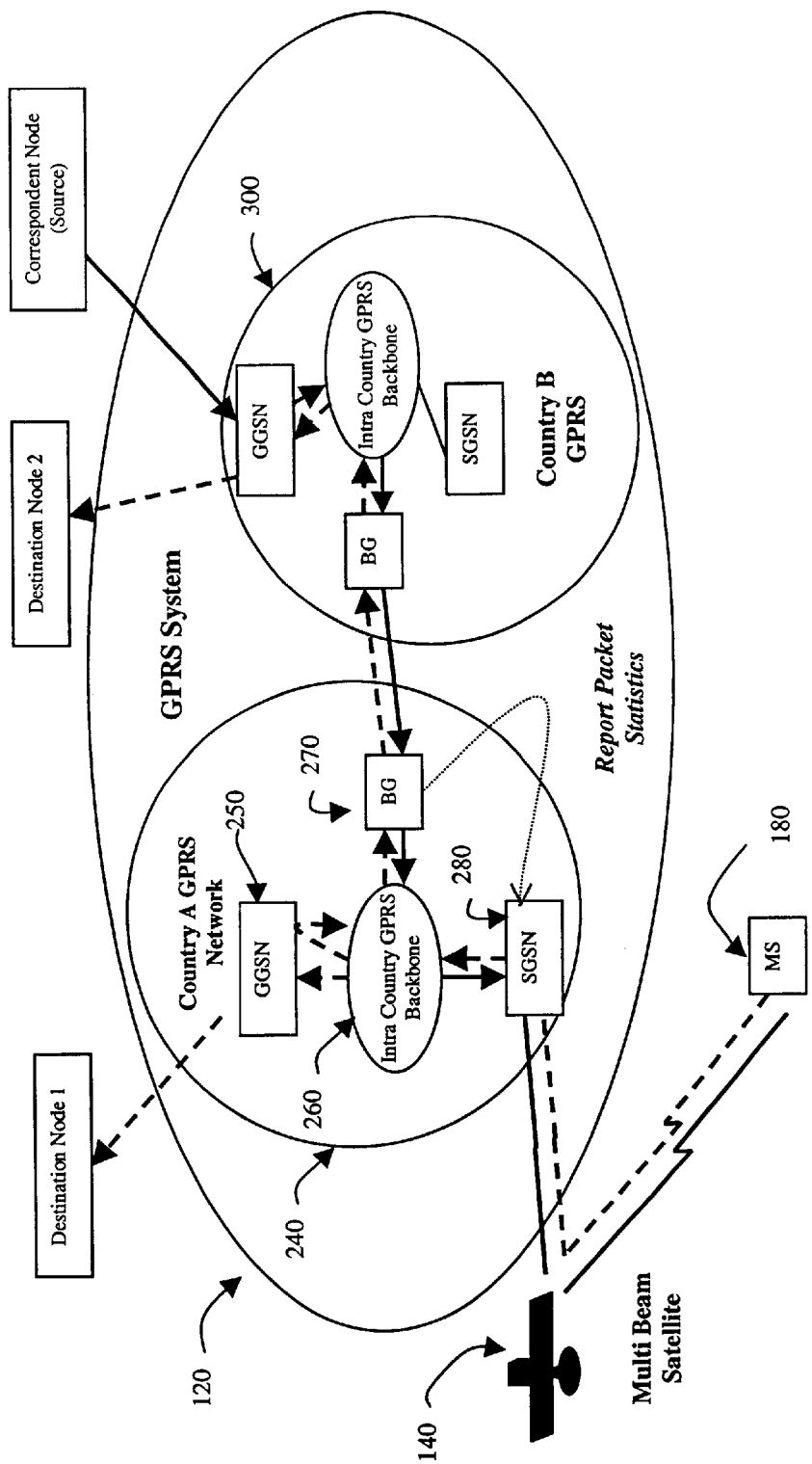
FIG. 2 is a schematic illustration of an exemplary packet data transfer according to one aspect of the present invention.

With reference to FIG. 2, a schematic illustration of the packet transfer according to one aspect of the present invention is shown. Packet data is received by the GGSN 250 of the GPRS network in country B (300) from a source node, for transfer to the MS 180. The GGSN 250 in country B is configured with the requisite PDP address information. Therefore, a particular PDP context is activated (across countries) between the GGSN 250 in country B and SGSN 280 of the GPRS network in country A (240). This context may be referred to as PDP context 1. Subsequently, the MS 180 requests another PDP context activation to be created locally in country A. This new context, referred to as PDP context 2, is used for uplink packet data transfer. For PDP context 2, some of the uplink packet data is routed to the Internet from the GGSN in country A to destination node 1, and some packets are forwarded from country A to country B through the respective BGs 270 such that these packets exit the GPRS system from country B's GGSN to destination node 2 as shown in FIG. 2.

As explained above, the SGSN uses the inner IP header source or destination IP address field (depending on the direction of traffic flow) to determine the PDP address used at the MS. By using the PDP context information stored at the SGSN, the SGSN is able to map the PDP address information to a particular MS's IMSI. Therefore, the SGSN may collect statistics corresponding to each MS. Further, if a particular country's GPRS network is used only as a transit between two other GPRS networks, the SGSN will have no mapping for that PDP address and it will automatically discard the statistical information for that packet. This is the desired behavior.

As a result of this process, the SGSN may compile statistical information concerning the total number (quantity) of packets that travel to/from each country for each MS. Additionally, the SGSN may use it's router capability to determine the traffic that flows through the local GPRS network for a specific MS, and compile statistical information concerning the total number of packets that are routed through the network in each direction. The SGSN is capable of "opening" each packet and taking out the GTP header. As set out above, the SGSN looks at the inner source IP address of outgoing packets in the uplink direction. Similarly, the SGSN may record the inner destination IP address of the incoming packets for the downlink packet transfer. These IP addresses indicate the PDP addresses used by a particular MS. The total number of packets transferred for each MS may be determined after mapping the PDP address to MS IMSI is completed by the SGSN. The actual number of packets that use the local GPRS network for a specific MS may easily be calculated by subtracting the total across country packet traffic from the total number of packets counted at the SGSN for the same MS.

In FIG. 2, the SGSN 280 in country A will derive the total number of packets traveling to country B from the reports of packet monitoring elements at the BG 270 in country A and also calculate the total number of packets sent locally through country A as explained above. Therefore, the SGSN 280 of the GPRS network in country A (240) is able to determine the optimal efficiency path by comparing the actual packet data statistics. A variety of determination algorithms may be defined for triggering the least cost routing procedure according to the present invention depending on the volume of data traffic.

According to one aspect of the present invention, the SGSN may collect the statistics for a "predetermined" number of packets and determine whether to implement the least cost routing procedure by comparison of the percentage of packets routed across another country for a specific MS. If the percentage exceeds a predefined "threshold" of the total traffic for the specific MS, the least cost routing procedure may be implemented. Given the random nature of packet data traffic, it is contemplated that the algorithm reacts to non-optimal/inefficient routings fast enough so that it will be "worthwhile" to trigger the least cost routing procedure. That is, there will be "sufficient" amount of the packet remaining to transfer that would make use of the optimal route after the least cost routing procedure is completed. This is a difficult task to accomplish, as the duration of each session can vary enormously and is hard to predict beforehand. The algorithm should also not react too quickly, because this may create too many "zig-zag" transfers and create an unacceptable amount of signaling overhead. It is also contemplated that the algorithm may learn from feedback regarding the real-time packet transfer behavior and be able to flexibly adjust the "threshold" percentage or the "predetermined" number of packets to be monitored necessary for decision making.

When the SGSN decides that the least cost routing procedure should be triggered, a new "optimal" GGSN is also determined. The determination of the new GGSN reflects the fact that the optimal GGSN is located in the network (for the country) which is used as the gateway to the Internet for most of the packet traffic. After the GGSN is determined, the SGSN will make use of the connectivity table to determine which SGSN in that network is the most efficient for attachment with the MS. After deriving this information, the SGSN will start the least cost routing procedure.

In reference to FIG. 2, if the SGSN 280 decides that the "percentage" of the predetermined number of packets routed to country B's network 300 is above a predetermined threshold, the SGSN 280 will determine that it is more efficient to re-attach the MS 180 to country B's network 300.

The new GGSN (250) and SGSN (280) information will be deduced, and the least cost routing procedure will be started with country B's GPRS network. The least cost routing procedure is described in detail as follows.

Figure 3:
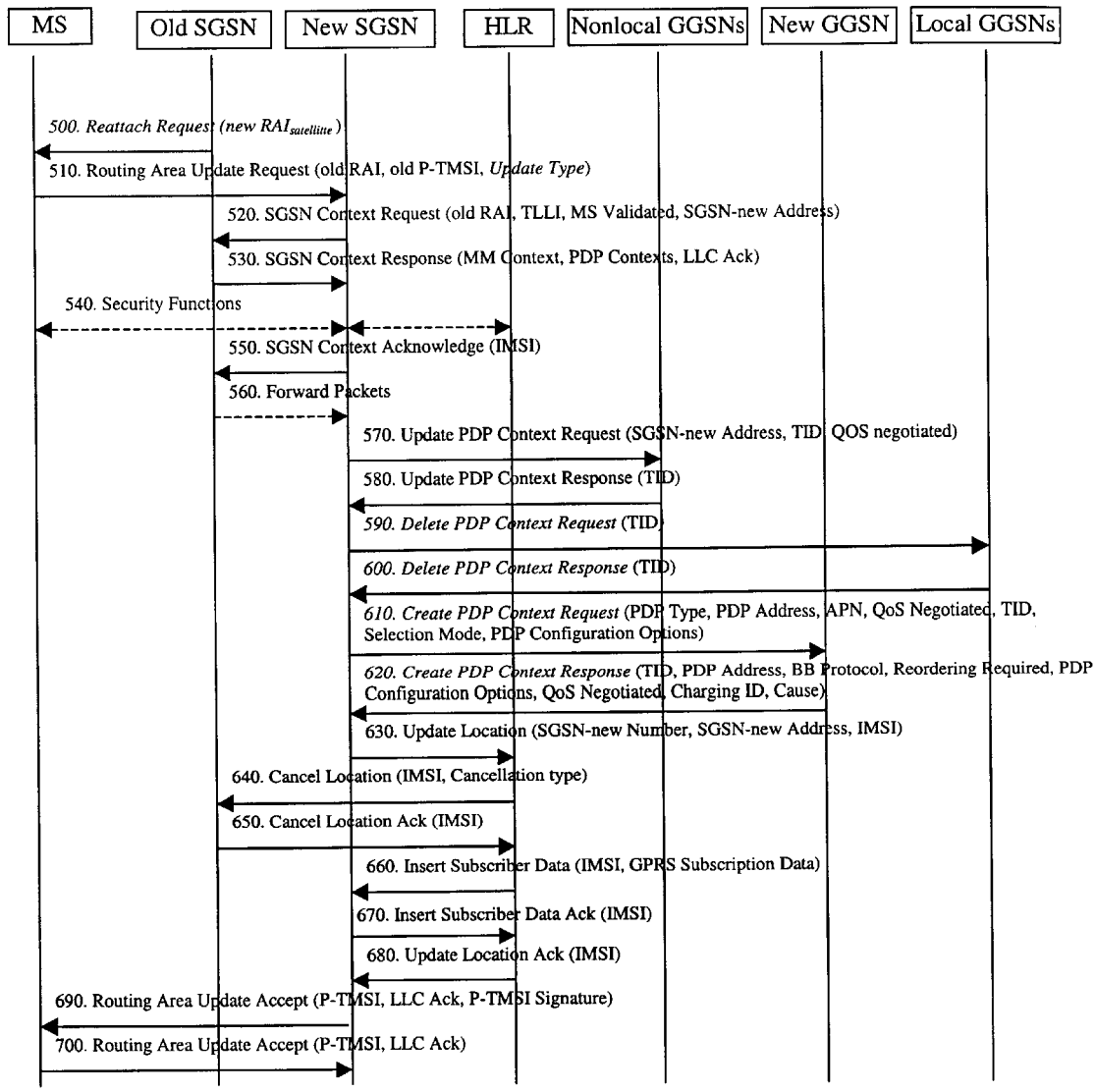
FIG. 3 is a schematic illustration of an exemplary packet data transfer procedure according to another aspect of the present invention.

With reference to FIG. 3, the least cost routing procedure is illustrated in detail with respect to the network components implementing the particular steps of the procedure in accordance with one aspect of the present invention. As set out above, the least cost routing procedure is an extension of the existing "Inter SGSN Routing Area Update" procedure defined in ETSI GSM 03.60, Section 6.9.1.2.2. The least cost routing procedure is triggered by the Reattach Request message 500. The Reattach Request 500 is sent from the old SGSN (the SGSN of the current sub-network) to the MS to trigger a re-attach with a new sub-network (country's GPRS network). The Reattach Request 500 includes the RAIsatellite value, that is, the RAI value and the SGSN identification number.

The Routing Area Update Request message 510 is sent by the MS to the new SGSN. The MS will make use of the SGSN number field of the RAIsatellite identifier to deduce the new SGSN to attach to. Also, within the Routing Area Update Request 510 the MS will have an indication of the "least cost routing procedure" in the Update Type field of this message. This is necessary as the least cost routing procedure has to be differentiated from the standard GPRS Inter SGSN RA Update procedure. As set out above, the Update Type field value is a new and unique value according to one aspect of the present invention.

Steps 520–560 are the same as corresponding existing steps 2–5 in the GPRS Inter SGSN RA Update procedure (ETSI GSM 03.60, Section 6.9.1.2.2).

The messages sent at steps 570–620 depend on whether the PDP contexts are local or non-local in the old GPRS network. To provide optimal efficiency, the local PDP contexts in the old GPRS network should be deleted and re-created in the new GPRS network. This minimizes across country packet transfers. However, across country packet transfers are not avoided entirely. As the determination to optimize efficiency (trigger the least cost routing procedure) has already been made based on the packet data behavior, it is likely that most packets are routed through the new sub-network's (new country's) GGSNs directly to the Internet. By deleting the old local PDP contexts and re-creating them with the new GGSN locally, costs due to transfers of packet data are generally minimized.

For PDP contexts that were originally activated cross-country (between sub-network BGs, for example), the PDP context is updated as in the conventional GPRS Inter SGSN RA Update procedure. This is due to the fact that cross-country routing cannot be avoided for these PDP contexts. There is an exception where the PDP contexts were originally cross-country between the new and the old GPRS networks. Such contexts automatically become local when the new SGSN sends the Update PDP Context Request message and cross-country packet transfer is avoided for these PDP contexts.

The new SGSN will get the PDP context information from the old SGSN (in steps 520–530) and it will be able to tell which of these contexts were local within the old GPRS network (now nonlocal) by using the previously described connectivity table and the "GGSN address in use" field of PDP context information. Then the new SGSN will update the PDP contexts that were non-local within the old SGSN (now local) using the Update PDP Context Request message. (step 570).

In steps 570 and 580, the Update PDP Context Request is sent from the new SGSN to the nonlocal GGSNs, that is, those GGSNs which are not local to the new SGSN (e.g., the old GGSN). This message includes the address of the new SGSN the TID and the QOS. A Tunnel Identifier (TID) is used by the GPRS Tunneling Protocol (GTP) between GSNs to identify a PDP context. The TID consists of an IMSI as described above, and a NSAPI. The NSAPI or Network layer Service Access Point Identifier is used for network layer routing. In the MS, the NSAPI identifies the PDP service access point. In the SGSN and GGSN, the NSAPI identifies the PDP context associated with a PDP address. The combination of IMSI and NSAPI uniquely identifies a single PDP context. The TID is described in detail in ETSI GSM 03.60, section 14. Format is defined in ETSI GSM 09.60, section 7.9.4. Similarly, negotiated QOS is described in detail in ETSI GSM 03.60. The nonlocal GGSNs update their PDP context fields and return an Update PDP Context Response (TID) at 580.

Deletion of the old (nonlocal) PDP contexts may be accomplished by a Delete PDP Context Request message (at step 590) and a Delete PDP Context Response message (at step 600). These steps are new and unique extensions to the GPRS Inter SGSN RA Update procedure according to one aspect of the present invention. Specifically, in step 590, the TID is sent from the new SGSN to the local GGSNs, thus identifying a new PDP context. Then in step 600 the TID is returned from the local GGSNs to the new SGSN.

New local PDP contexts are then created (re-created) by a Create PDP Context Request message (at step 610) and a Create PDP Context Response message (at step 620). These steps are also new and unique extensions to the GPRS Inter SGSN RA Update procedure according to one aspect of the present invention. Specifically, in step 610, the new SGSN sends a new PDP context to the new GGSN to which it is attached. Then in step 620 the new GGSN returns the new PDP context to the new SGSN. The values of the new PDP context are set out in detail in ETSI GSM 09.60, section 7.9.21.

The PDP context information is created end to end between an MS and a GGSN. But, in order not to disturb the ongoing flow of packets, the active PDP context information at the MS should be preserved. Therefore, the deletion of the old local PDP contexts is initiated by the new SGSN with the Delete PDP Context Request message. (step 580). Similarly, the new SGSN initiates the creation of the new PDP context activation by the new GGSN with the Create PDP Context Request message (step 610). The same PDP address information will be used for the PDP context activation with the new GGSN in step 610. The other attribute fields will also be filled from the PDP context information derived from the old SGSN. This will enable the MS to continue using the same PDP context and receive data without any distraction, preserving the end-to-end MSGGSN relationship.

The Protocol Configuration Options attribute of Create PDP Context Request message (step 610) will need to be provided by the SGSN that wishes to activate the new PDP context. As there is no dynamic address allocation to the MS at this phase, the Configuration Protocol value should be PPP [IETF RFC 1661], which would specifically be IPCP [IETF RFC 1332] for IP as defined in GSM 09.60. IPCP Configuration packets will have the PDP address of the MS in their IP address fields and default value, "no compression" in their TCP/IP header compression fields. The GGSN may modify these configuration parameters and send them back to the SGSN with the Create PDP Context Reply message (step 620).

Through the procedures and system according to various aspects of the present invention, there is provided an efficient solution to the problem of least cost routing for packet data traffic in a mobile satellite system employing a GPRS network infrastructure. This approach requires a minimal number of changes to the terrestrial GPRS network infrastructure, elements and identities. Only upgrading the SGSN and extending the definition of the RAI due to the wide area systems coverage characteristic of the GEO satellite GPRS network is required. This approach also introduces changes to standard GPRS procedures but the number of new and additional signaling messages is minimized. Additionally, no new signaling protocols are introduced or required. Moreover, this solution is independent of the address assignment (static or dynamic) of the MSs and the origination of packet transfer (uplink or downlink) and works for multiple PDP contexts independent of the packet origination.

The decision criterion for optimizing efficiency depends on the volume of packet traffic for an MS. It is not determined per PDP context; and therefore, it is not dependent of the number and activity of the PDP contexts. It also does not depend on or react to the activation of new and deactivation of existing PDP contexts. The determination to implement the least cost routing procedure is merely a function of the usage of PDP addresses bundled for an MS. All the existing attributes associated with the PDP contexts make the additional processing capability that is required to be added to the SGSNs (to implement the least cost routing procedure) minimal. The SGSNs are able to process the header information of the packets collected from the packet monitoring elements at the BGs and map the PDP addresses to MS IMSIs and make a decision based on the collected statistical information for each MS.

Additionally, the monitored packet statistics distribution may be limited only to the SGSNs in the same country (same sub-network). This will create less overhead at the SGSNs and will be more easily achievable from a practical network perspective. Even this limitation may require more than one instance of the activation of the least cost routing procedure to reach optimization, the proposed algorithm will eventually converge to the least cost packet data transfer. Full mesh connectivity between GPRS networks would lead to route optimization more quickly, with only one time initiation of the procedure.

INDUSTRIAL APPLICABILITY

With reference to FIG. 2, a practical implementation of the network and procedure according to an aspect of the present invention is illustrated. The SGSN in country A has determined to initiate the least cost routing procedure with country B. The SGSN then determines a new GGSN and SGSN in Country B following the procedures and rules explained previously. The SGSN in country A then forwards the active PDP context information to the new SGSN in country B. The SGSN in country B deduces that PDP context 2 was local whereas PDP context 1 was non-local with Country A. For PDP context 2, the SGSN in country B deletes the old PDP context in county A and recreates the PDP context locally in country B. For PDP context 1, the new SGSN will update the PDP context at the GGSN in country B with the new SGSN information.

Figure 4:
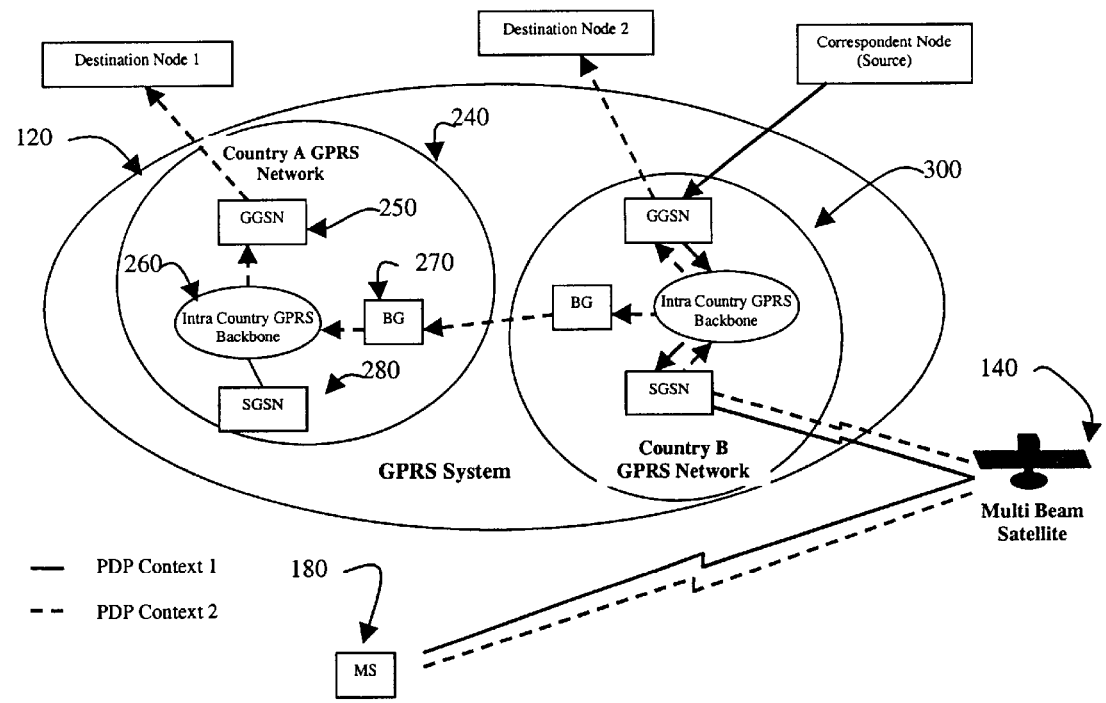
FIG. 4 is a schematic illustration of an exemplary packet data transfer accomplished using a procedure according to another aspect of the present invention.

With reference to FIG. 4, the packet routing after the least cost routing procedure is completed is illustrated. While there is still some across country traffic, most of the packets use country B's local network for interworking with IP nodes. Therefore, maximum efficiency in packet transfer is accomplished for this scenario with the network and procedure according to one aspect of the present invention. In FIG. 4, a schematic illustration of the packet transfer according to one aspect of the present invention is shown. Packet data is received by the GGSN 250 of the GPRS network in country B (300) from a source node, for transfer to the MS 180. The GGSN 250 in country B is configured with the requisite PDP address information. Therefore, a particular PDP context is activated between the GGSN 250 in country B and SGSN 280 of the GPRS network in country B (240). No longer does the PDP context transit sub-networks (to the GPRS network in country ), as was the case with repect to FIG. 2 (prior to performance of the least cost routing procedure). This context may be referred to as PDP context 1. Subsequently, the MS 180 requests another PDP context activation to be created locally in country B (instead of country A as in the previous example). This new context, referred to as PDP context 2, is used for uplink packet data transfer. For PDP context 2, some of the uplink packet data is routed (forwarded) from country A to country B through the respective BGs 270 such that the packet data is routed from the BG in country A through the GPRS backbone 260 to the GGSN in country A, and then on to the Internet (to destination node 1). However, most of the packet data is routed through the network of country B to the Internet, these packets exit the GPRS system from country B's GGSN to destination node 2 as shown in FIG. 4.

It may be anticipated, as is evident from the foregoing description, that certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A method for transferring packet data within a multi-country telecommunications network that connects mobile stations within a satellite GPRS system, including:

detecting a quantity of data packets corresponding to a particular mobile station routed through a telecommunications network of a first country;

detecting a quantity of data packets corresponding to the particular mobile station transferred between the telecommunications network of the first country and at least a telecommunications network of a second country;

reporting the quantity of data packets routed through the telecommunications network of a first country;

reporting the quantity of data packets transferred between the telecommunications network of a first country and the telecommunications network of the second country; and determining whether to transfer routing control from the telecommunications network of the first country to the telecommunications network of the second country based on the reported quantity of routed data packets and the reported quantity of transferred data packets, when the reported quantity of transferred data packets exceed a predetermined threshold of the reported quantity of routed data packets.

2. A method for transferring packet data within a multi-country telecommunications network that connects mobile stations within a satellite GPRS system, including:
 detecting a quantity of data packets corresponding to a particular mobile station routed through a telecommunications network of a first country;
 detecting a quantity of data packets corresponding to the particular mobile station transferred between the telecommunications network of the first country and at least a telecommunications network of a second country;
 reporting the quantity of data packets routed through the telecommunications network of a first country;
 reporting the quantity of data packets transferred between the telecommunications network of a first country and the telecommunications network of the second country;
 determining whether to implement a least cost routing procedure based on the reported quantity of routed data packets and the reported quantity of transferred data packets;
 implementing the least cost routing procedure when the reported quantity of transferred data packets exceed a predetermined threshold of the reported quantity of routed data packets; and
 transferring routing control from the telecommunications network of the first country to the telecommunications network of the second country according to the least cost routing procedure.

3. The method for transferring packet data according to claim 2, wherein:
 the least cost routing procedure is initiated by a message sent from the telecommunications network of the first country to the particular mobile station.

4. The method for transferring packet data according to claim 3, wherein the message sent from the telecommunications network of the first country to the particular mobile station is a reattach request message with a new RAI satellite for a GPRS mobile satellite network.

5. The method for transferring packet data according to claim 2, wherein the least cost routing procedure further includes:
 requesting a routing area update with a "least cost routing" as an update type, requesting an update of an existing PDP context with nonlocal GGSNs; and
 receiving an updated PDP context response.

6. The method for transferring packet data according to claim 5, wherein the least cost routing procedure further includes:
 deleting the existing PDP context with local GGSNs; and
 creating a new PDP context with a new GGSN.

7. A satellite telecommunications network that connects mobile stations within a satellite GPRS system having sub-telecommunications networks for transferring information including packet data comprising:
 at least one mobile station;
 a first sub-telecommunications network;
 a second sub-telecommunications network interconnected with the first sub-telecommunications network;
 a plurality of first nodes, at least one first node corresponding to each of the first sub-telecommunications network and the second sub-telecommunications network, and the first nodes being operative to provide interworking between the first and the second sub-telecommunications networks and external packet data networks; and
 the at least one mobile station connected to the telecommunications network through a multi-beam geostationary satellite,
 further including a controller for:
 detecting a quantity of data packets corresponding to the at least one mobile station routed through the first sub-telecommunications network;
 detecting a quantity of data packets corresponding to the at least one mobile station transferred between the first sub-telecommunications network and the second sub-telecommunications network;
 reporting the quantity of data packets routed through the first sub-telecommunications network;
 reporting the quantity of data packets transferred between the first sub-telecommunications network and the second sub-telecommunications network; and
 determining whether to transfer routing control from the first sub-telecommunications network to the second sub-telecommunications network based on the reported quantity of routed data packets and the reported quantity of transferred data packets, when the reported quantity of transferred data packets exceed a predetermined threshold of the reported quantity of routed data packets.

8. A satellite telecommunications network that connects mobile stations within a satellite GPRS system having sub-telecommunications networks for transferring information including packet data comprising:
 at least one mobile station;
 a first sub-telecommunications network;
 a second sub-telecommunications network interconnected with the first sub-telecommunications network;
 a plurality of first nodes, at least one first node corresponding to each of the first sub-telecommunications network and the second sub-telecommunications network, and the first nodes being gateway GPRS support nodes operative to provide interworking between the first and the second sub-telecommunications networks and external packet data networks; and
 the at least one mobile station connected to the telecommunications network through a multi-beam geostationary satellite,
 wherein the first sub-telecommunications network including:
 a gateway operable to detect a quantity of data packets corresponding to the at least one mobile station routed through the first sub-telecommunications network, and operable to detect a quantity of data packets corresponding to the at least one mobile station transferred between the first sub-telecommunications network and the second sub-telecommunications network; and
 at least one second node interconnected with the gateway and the at least one first node corresponding to the first sub-telecommunications network, operable to accumulate statistics on the quantity of data packets routed through the first sub-telecommunications network and operable to accumulate statistics on the quantity of data packets transferred between the first sub-telecommunications network and the second sub-telecommunications network.

9. The telecommunications network according to claim 8, wherein the gateway is a border gateway of a GPRS network, and the at least one second node is a serving GPRS support node.

10. The telecommunications network according to claim 8, wherein the at least one second node is further operable to determine whether to transfer routing control from the first sub-telecommunications network to the second sub-telecommunications network based on the accumulated statistics when the quantity of data packets transferred between the first sub-telecommunications network and the second sub-telecommunications network exceed a predetermined threshold of the quantity of data packets routed through the first sub-telecommunications network.

11. The telecommunications network according to claim 8, wherein the at least one second node is further operable to determine a first node corresponding to the second sub-telecommunications network to provide interworking between the second sub-telecommunications network and the external packet data networks.

12. The telecommunications network-according to claim 8, wherein the second node is operable to transmit a message to the at least one mobile station to initiate the transfer of routing control.

13. The telecommunications network according to claim 12, wherein the message to at least one mobile station to initiate the transfer of routing control is a reattach request message with the new satellite routing area identifier.

14. The telecommunications network according to claim 8, wherein the second sub-telecommunications network further includes at least one second node interconnected with the at least one first node corresponding to the second sub-telecommunications network, and the at least one second node of the second sub-telecommunications network is operative to transmit a message for updating an existing PDP context to the at least one first node corresponding to the first sub-telecommunications network, and is operable to receive an acknowledgement of the message for updating an existing PDP context therefrom for nonlocal PDP contexts.

15. The telecommunications network according to claim 14, wherein the at least one second node of the second sub-telecommunications network is operative to transmit a message for deleting an existing PDP context to the at least one first node corresponding to the first sub-telecommunications networks receive an acknowledgement of the message for deleting an existing PDP context therefrom for local PDP contexts, transmit a message for creating a new PDP context to the at least one first node corresponding to the first sub-telecommunications network and receive an acknowledgement of the message for creating a new PDP context therefrom for local PDP contexts.

16. The telecommunications network according to claim 11, wherein the at least one second node of the second sub-telecommunications network is operative to transmit a message for creating a new PDP context to the at least one first node corresponding to the second sub-telecommunications network, and is operable to receive an acknowledgement of the message for creating a new PDP context therefrom.

17. A method for transferring packet data within a multi-country telecommunications network that connects mobile stations within a satellite GPRS system, comprising:

detecting in the first country a quantity of data packets corresponding to a particular mobile station routed through a telecommunications network of the first country;

detecting in the first country a quantity of data packets corresponding to the particular mobile station transferred between the telecommunications network of the first country and at least a telecommunications network of a second country;

reporting the quantity of data packets routed through the telecommunications network of the first country to an element of the telecommunications network of the first country;

reporting the quantity of data packets transferred between the telecommunications network of a first country and the telecommunications network of the second country to an element of the telecommunications network of the first country; and determining, by an element of the telecommunications network of the first country, whether to transfer routing control from the telecommunications network of the first country to the telecommunications network of the second country based on the reported quantity of routed data packets and the reported quantity of transferred data packets, when the reported quantity of transferred data packets exceed a predetermined threshold of the reported quantity of routed data packets.

* * * * *